March 20, 1928.

W. R. HUME 1,662,858

AUTOMATIC CONTROL DEVICE FOR ELECTRIC ARC WELDING APPARATUS

Filed Sept. 21, 1925      2 Sheets-Sheet 1

Inventor:

Walter Reginald Hume

By *(signature)*

Attorney.

Inventor:
Walter Reginald Hume
By
Attorney.

Patented Mar. 20, 1928.

1,662,858

UNITED STATES PATENT OFFICE.

WALTER REGINALD HUME, OF MELBOURNE, VICTORIA, AUSTRALIA.

AUTOMATIC CONTROL DEVICE FOR ELECTRIC-ARC-WELDING APPARATUS.

Application filed September 21, 1925, Serial No. 57,744, and in Australia October 9, 1924.

This invention relates particularly to automatic arc welding machines the successful operation of which relies to a great extent upon the accurate control of the arc length, that is the distance between the electrode point and the work. Such automatic arc welding machines have hitherto possessed objections which have limited their use, these objections being chiefly due to the intricate and delicate nature of the devices for adjusting and controlling the arc length, which devices being unreliable in operation, have frequently caused defective welding. For such reasons electric arc welding is largely carried out by hand manipulation of the electrode, but such hand control of the arc length, even with a highly skilled operator, lacks the continuity and uniformity essential to the production of a perfect weld, and resulting imperfections render the work defective, and in many cases useless.

The difficulty in maintaining the correct arc length throughout the welding process is due principally to the fact that a crater or cavity of continually varying depth is formed beneath the electrode point, whilst on the other hand the electrode is continually forming or casting off particles of molten metal with the result that the arc length continually varies and the voltage and amperage of the current across the arc is subject to constant momentary changes between the permissible extremes of maximum and minimum.

It has hitherto been proposed, in automatic arc welding machines, to overcome the above difficulties by automatically feeding the electrode to the work by suitable feed rollers driven by an electric motor the armature of which is connected across the terminals of the welding arc so that the speed of the motor and consequently the rate of feed of the electrode increases as the voltage across the arc increases due to an increase in the arc length, whilst the feeding speed of the motor decreases as the voltage decreases due to a shortened arc. Whilst the armature of the feed motor has been connected to the welding or arc circuit, which continually varies in voltage as aforesaid, it has, in machines of the type referred to, hitherto been considered necessary to excite the fields of the feed motor from a source of constant potential and for this purpose a secondary or constant potential circuit has been introduced, and connected with the field windings of the feed motor. The apparatus has been rendered unduly complicated, expensive and unreliable by the introduction into this constant potential or field circuit, of various electrical devices such as relays, rheostats, resistances, and the like which have been introduced into the field exciting circuit to effect the desired automatic control of the feed motor and the arc length.

The primary object of the present invention is to provide, in conjunction with an electric motor for controlling the electrode feed as aforesaid, a centrifugal governor which is operated by said motor so that its motion fluctuates or varies in accordance with the fluctuations or variations in the current voltage across the arc. By the use of this governor the varying rotary motion of the motor is converted into a correspondingly varying reciprocatory motion wh. may, in turn, be applied direct to the control of the electrode feeding mechanism, as for instance, to the opening and closing of a fluid control valve which controls the feeding of the electrode to the work. This may be conveniently effected by connecting an opening and closing lever of such valve to a reciprocatory part of the governor.

Alternatively the reciprocatory part of the governor may be connected to a rheostat controlling lever adapted to regulate the current passing to a separate electrode feed motor which may be suitably geared to the electrode feeding rollers or the like.

A further object of the invention is to entirely eliminate the said secondary or constant potential circuit and its various associated electrical devices connected with the field winding of an electrode feed control motor as above mentioned, and to thereby render the apparatus much simpler and cheaper in construction and more reliable and efficient in operation. With this object in view I provide a series wound motor to operate the said governor and thus control the electrode feed, this series wound motor being directly connected across the terminals of the welding arc so that the fluctuations of the current at the arc are communicated to both the armature and the field winding of the motor, thereby entirely eliminating the aforesaid secondary or constant potential circuit for exciting the motor field and also dispensing with the various intricate and delicate electrical appurtenances which have hitherto been incorporated in this field circuit. By thus directly connecting a series wound feed controlling motor into the variable voltage welding circuit I have found by experiment that important advantages of much greater simplicity, reduced cost of manufacture, and greater reliability and efficiency may be obtained.

By connecting a series wound feed control motor directly across the welding arc as above mentioned, the motor is caused to respond precisely to the varying arc lengths by rotating at speeds in direct ratio to the mean voltage pressure, the weight of the motor armature and its centrifugal action being of sufficient intensity to effectively resist the rapid speed changes set up therein by the continual variations or fluctuations in the voltage across the arc. Smooth and continuously uniform feeding of the electrode and consequent maintenance of the correct arc length is thus ensured.

It is to be understood that the electrode feeding mechanism which is automatically controlled by the electric motor connected into the welding circuit as above-mentioned may be of any suitable nature. For instance, such feeding mechanism may comprise feed rollers or the like adapted to be driven by said motor direct or the said feed rollers may be driven by a separate feed motor, the supply of current to which is controlled by the first named or controlling motor. Alternatively, the electrode feeding mechanism may consist of hydraulic or fluid operated feeding apparatus which ensures a smooth and uninterrupted feed. Moreover the electrode may be either in the form of a straight rod or of the continuous coiled wire type.

Referring to the drawings which form part of this specification:—

Figures 1 and 2 are wiring diagrams showing alternative methods of connecting an electrode feed control motor in a welding arc circuit in accordance with the present invention. In these figures plain arrows are employed to indicate the path of the current before the welding arc has been struck, whilst barbed arrows indicate the path of the current when the arc is struck and the welding operation is in progress.

Like reference numerals are employed to denote like or equivalent parts throughout the following description and in the drawings.

Figure 1:
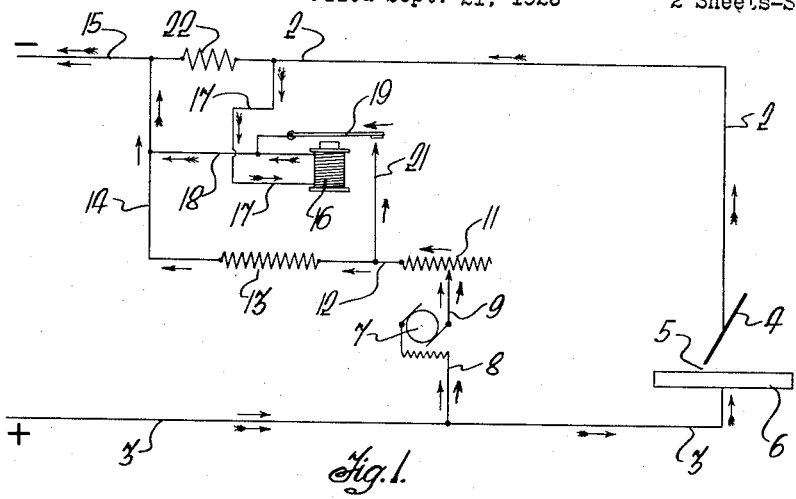

Referring more particularly to Figure 1, the reference numerals 2 and 3 indicate conductors which are connected to the electrode 4 and the work 6 respectively, the location of welding arc being indicated at 5. The numeral 7 indicates a series wound electrode feed control motor which is directly connected across the arm 5 by a conductor 8 connected to the conductor 3, whilst a conductor 9 leads from the armature of the motor. This conductor 9 may be connected to a manually adjustable rheostat or resistance 11 whereby the mean speed of the motor may be manually controlled apart from the influence of fluctuations in the welding arc circuit as aforesaid. By manipulation of this rheostat or resistance 11 the electrode feed control may be adjusted to meet greater or lesser demands for the fusing of the electrode in accordance with the predetermined current amperage employed that is to say that as the amperage is increased so the amount of fusion becomes greater and the speed of the motor 7 must be increased to meet the greater demand for electrode. By the employment of a manually operated rheostat or resistance as above mentioned, this speed of the motor may be regulated or set according to requirements quite apart from the automatic control of the feeding speed which is provided in accordance with the variations in voltage at the arc as aforesaid.

The manually adjustable rheostat or resistance 11 may be connected by a conductor 12 to a fixed resistance 13 from which a conductor 14 leads to a conductor 15 which latter with the conductor 3 is connected with a suitable source of electric power.

A by-pass circuit controlling a relay magnet 16 is incorporated with the foregoing to divert portion of the current from the main arc welding circuit through motor 7 when the arc has been struck. Accordingly a conductor 17 may be connected between one terminal of the relay coil and the conductor 2 whilst a conductor 18 extends between the other terminal of the relay and the conductor 14. The conductor 18 is connected to the armature 19 of the relay 16, and, upon the latter being energized by the initiation or striking of the arc at 5, the armature 19 closes a circuit through a by-pass conduction 21, which is connected to the conductor 12.

A fixed resistance 22 may be interposed in the conductor 2 between the points of connection thereto of the conductors 14 and 17 so as to divert the current from conductor 2 to the relay 16 when the welding circuit is closed by the striking of the arc.

Figure 2:
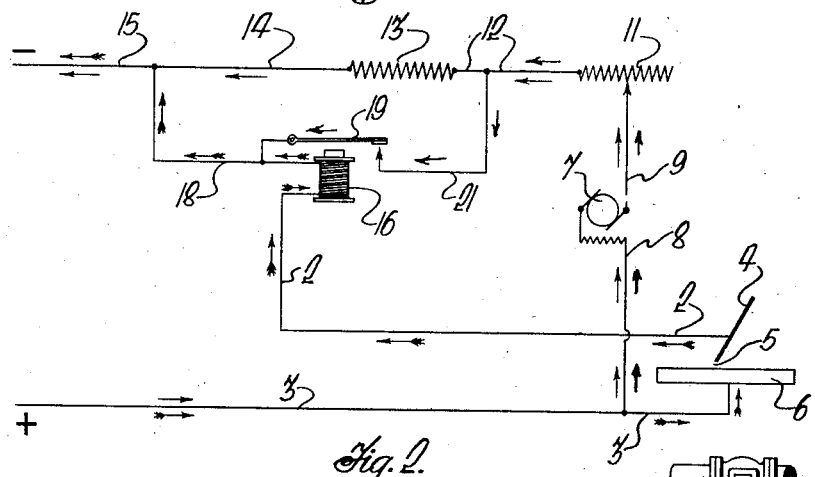

Figure 2 illustrates a modified method of wiring for connecting the series wound electrode feed control motor 7 directly across the terminal of the welding arc and for operating the aforesaid relay to close the by-pass circuit when the arc is struck. According to this method of wiring, resistance 22 seen in Figure 1 is eliminated, the various other parts being indicated by the same numerals as the corresponding parts in Figure 1.

Prior to the striking or initiation of the arc, the current flows by way of conductors 3 and 8 through the series wound motor 7, thence by way of conductor 9 through the variable resistance 11, which is adjusted to give the desired mean operating speed of the motor. From this resistance 11 the current passes through conductor 12, fixed resistance 13 and conductor 14 to the return or negative conductor 15 as indicated by the plain or unbarbed arrows in Figures 1 and 2.

When the arc 5 is struck the current, diverted by the resistance 13, flows between the arc terminals formed by the work 6 and electrode 4 to the conductor 2, thence through the electromagnet or relay 16 and conductor 18 to the return lead 15. This causes the relay 16 to be energized, thus closing its armature 19 so that portion of the current passes through the by-pass conductor 21, the adjustable resistance 11 and the control motor 7 from the conductor 3, the resistance 13 preventing the current from taking circuit through the conductor 14 to the return lead 15.

Fluctuations in the length of the arc at 5 and consequent fluctuations in the voltage of the current passing through the welding circuit are thus immediately communicated to the controlling motor 7 which causes the feeding speed of the electrode to be automatically increased or diminished in accordance with requirements as will be hereinafter more readily understood.

Figure 4:
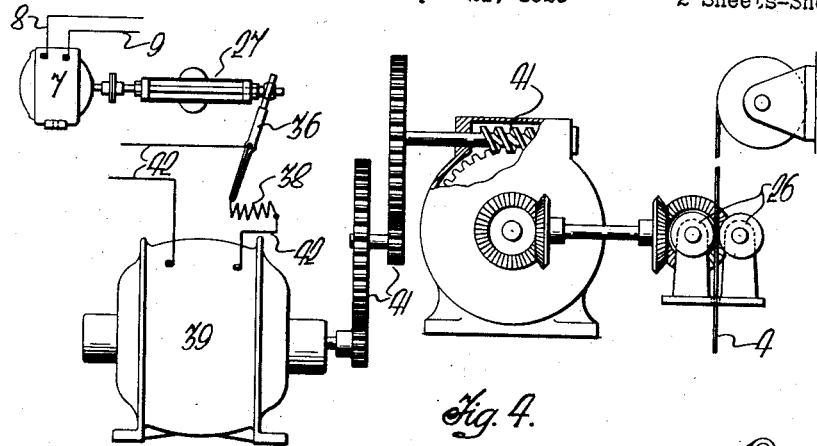
Figures 4, 5 and 6 are semi-diagrammatic views illustrating various applications of the electric motor and governor control device as seen in Figure 3 for automatically controlling the feed of an electrode, in accordance with fluctuations in a welding arc circuit.
Figure 6:
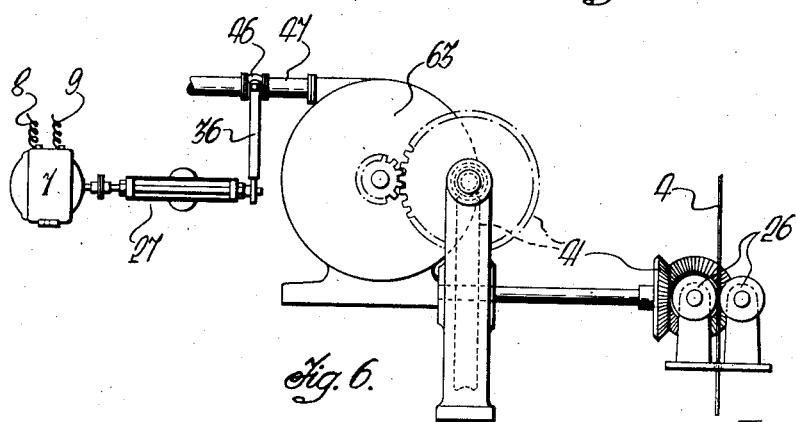

As previously mentioned, the series wound electrode feed control motor 7 connected across the welding arc as aforesaid may, if desired, be adapted to drive the electrode feeding mechanism such for instance as the co-acting feed rollers 26 indicated in Figures 4 and 6. Any fluctuations in the current passing through the arc welding circuit will thus be communicated to the motor 7 so that the rate of feed of the electrode 4 will vary synchronously with variations in the length of the welding arc 5.

Preferably, however, and to ensure a more sensitive control of the electrode feed, the controlling motor 7, instead of being adapted to drive the feeding mechanism, is utilized solely to govern or regulate the working speed of the electrode feeding mechanism according to fluctuations in the arc length. For this purpose a motor 7 of considerably less power and weight and of greater sensitiveness may be employed, such relatively small motor being series wound and directly connected with the electrode or welding arc as aforesaid.

In conjunction with the motor 7, I employ a centrifugal governor indicated in general at 27 in Figures 3 to 6. The spindle 28 of this governor is coupled as at 29 to the motor spindle and the reciprocatory collar or member 31 of the governor may be flexibly connected to a fixed collar or the like 32 by suitable means, such as, spring arms 33 bearing the usual weights 34 intermediately of their length. A sleeve 35 movable with the reciprocatory collar 31 may encircle the governor spindle 28 as shown in order to limit the inward travel of said collar 31.

The reciprocatory member 31 of the governor is loosely connected as at 30 to an operating member such as a lever 36 whereby the reciprocatory motion of the member 31 incidental to speed variations of the motor 7, due to fluctuations in the arc length, is transmitted to an associated regulating device for controlling the operation of the electrode feeding mechanism. As seen, for example, in Figure 4 this regulator may consist of a rheostat or variable resistance 38, which, through the governor operated lever 36, regulates the supply of current to a separate and larger electric motor 39 which may be connected in an independent electrical circuit, indicated at 42, and is adapted to actuate the feed rollers 26 through the medium of suitable reduction gearing indicated generally at 41. No claim is made to the specific construction of Fig. 4 since that forms the subject matter of my copending divisional application Serial No. 241,921, filed December 22, 1927.

Figure 3:
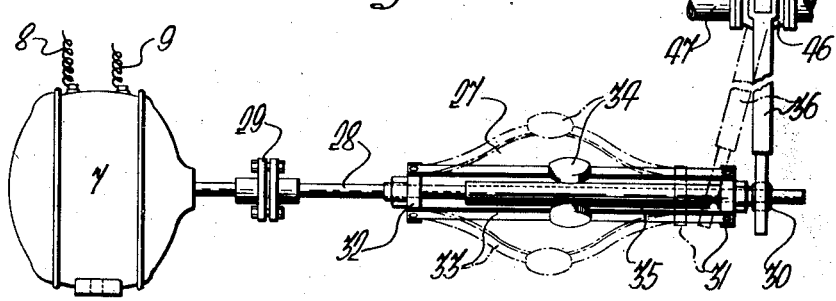
Figure 3 shows an embodiment of the improved electro-mechanical control device wherein a centrifugal governor is coupled to and driven by an electric controlling motor, connected in the desired circuit, the reciprocatory part of the governor being shown connected to a fluid regulating valve.
Figure 5:
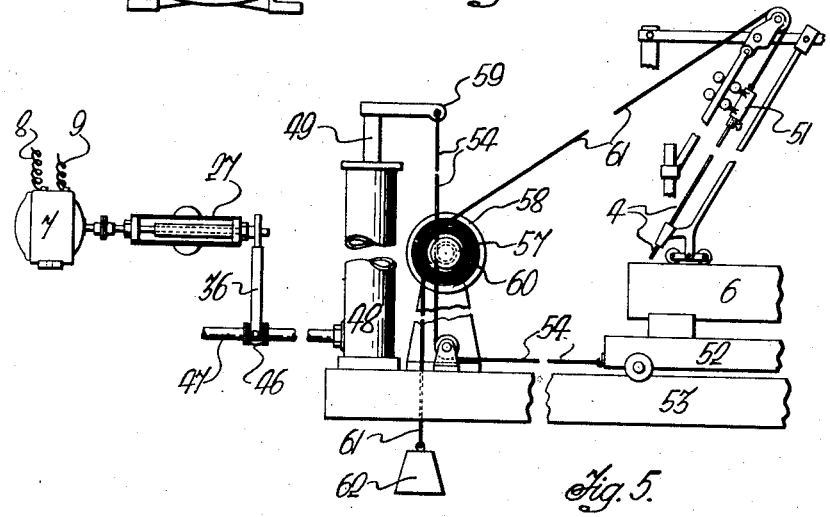

It will be evident that by employing a separate or independent feed motor as at 39, to operate the electrode feeding mechanism, such feed motor being controlled by the governor 27 and the controlling motor 7 which is incorporated in the welding arc circuit as aforesaid, an extremely sensitive automatic control in accordance with current fluctuations in the welding circuit will be obtained thus ensuring that the proper amount of electrode is fed forwardly in accordance with requirements at the arc.

Where fluid operated means is employed to feed the electrode, the operating member or lever 36, which is connected to the motor driven governor 27, may be adapted to operate a regulator consisting of a fluid control valve 46 interposed in a fluid supply pipe 47 as seen in Figures 3 and 5. This supply pipe may lead to a hydraulic cylinder 48 in which a piston 49 works, the movement of this piston in the cylinder 48 under the influence of the pressure fluid admitted through pipe 47, being adapted to advance an electrode holder 51 carrying the electrode 4 towards the work 6 as disclosed in the specification of my prior United States application Serial No. 734,716, filed 28th August, 1924. If desired, the feed control motor 7 and associated parts may also serve to control the traversing movement of the work 6 in accordance with the feed of the electrode. For this purpose apparatus such as disclosed in my aforesaid prior patent may be employed wherein the work is placed upon a wheeled traversing carriage 52 capable of movement along tracks or rails provided in or on a suitable framework 53. The work carriage 52 may be connected to a flexible operating line 54 which passes around a shaft or pulley 57 carrying a cone pulley 58, and is connected as at 59 to the piston 49. A second flexible operating line 61 may be coiled around the cone pulley 58 which is provided with a number of circumferential grooves 60 of different diameters to accommodate said second operating line one end of which is connected to the electrode holder 51 whilst the other end bears a weight 62. In order to adjust the rate of the electrode feed relative to the rate of traverse of the work carriage 52 the coiled portion of the operating line 61 may be shifted into different grooves 60 of the cone pulley 58.

According to the embodiment shown in Figure 6, which also discloses fluid operated electrode feeding mechanism, the feed control motor 7, connected in the welding arc circuit as aforesaid, is coupled to the governor 31 connected to an operating lever 36 as previously mentioned. In this embodiment, however, the lever 36 is adapted to operate the fluid control valve 46 which regulates the admission of pressure fluid to a turbine or the like 63 which may be suitably geared as indicated at 41 to a pair of electrode feeding rollers 26. In this instance, as in the previously described embodiments, the feed control motor 7 exercises a direct controlling influence over the rate of the electrode feed, according to variations in the arc length and corresponding fluctuations in the current passing through the arc circuit which includes said motor.

In addition to its application to electric arc welding apparatus as above described, the varying reciprocatory movement produced by the governor in accordance with the variations in the voltage of an electric current can be applied to a variety of other purposes, for instance in the operation of electric furnaces or other similar appliances wherein an arc length of correct or predetermined length is required to be maintained. Likewise where varying voltages in an electric current require to be registered or recorded the centrifugal governor may be operatively connected to a suitable recording mechanism. Or the governor may be adapted to operate various other mechanical or electrical devices, such for instance as selectors, switches, rheostats or the like whereby the movements produced by the governor in accordance with the current fluctuations passing through the motor, may be communicated or applied in corresponding sequence to the desired instrument or device.

Having now described my invention what I claim as new and desire to secure by Letters Patent is:—

1. In electric arc welding apparatus the combination of an electric motor connected into the welding circuit, a centrifugal governor operated by said motor, fluid operated electrode feeding mechanism, a fluid control valve adapted to control the operation of said electrode feeding mechanism, and means interposed between said governor, and said control valve for communicating to the latter the movements produced by the governor in accordance with fluctuations in the current passing through said motor.

2. In electric arc welding apparatus the combination of an electric motor connected into the welding circuit, a centrifugal governor operated by said motor, fluid operated electrode feeding mechanism, a fluid control valve adapted to control the operation of said electrode feeding mechanism, and an operating lever connecting said governor with said valve to communicate to the latter the reciprocatory movements produced by the governor in accordance with fluctuations in the current passing through said motor.

3. In electric arc welding apparatus the combination of a series wound feed control motor directly connected across the terminals of the welding arc, a centrifugal governor operated by said motor, an operating lever connected to said governor, electrode feeding means adapted to feed the electrode continuously towards the work, and a regulating device actuated by the reciprocatory movements of said lever to thereby automatically control, in accordance with fluctuations in the voltage of the welding arc, the rate of the electrode feed without altering the direction thereof.

In testimony whereof I affix my signature.

WALTER REGINALD HUME.